(12) United States Patent
Reitterer et al.

(10) Patent No.: US 10,009,600 B2
(45) Date of Patent: Jun. 26, 2018

(54) DISPLAY OR PROJECTION APPARATUS FOR A VIDEO SIGNAL, AND LIGHT-EMITTING MODULE AND CALIBRATION METHOD THEREFOR

(71) Applicant: TriLite Technologies GmbH, Vienna (AT)

(72) Inventors: Joerg Reitterer, Vienna (AT); Franz Fidler, Vienna (AT)

(73) Assignee: TriLite Technologies GmbH, Vienna (AT)

( * ) Notice: Subject to any disclaimer, the term of this patent is extended or adjusted under 35 U.S.C. 154(b) by 169 days.

(21) Appl. No.: 15/025,967

(22) PCT Filed: Sep. 24, 2014

(86) PCT No.: PCT/AT2014/050216
§ 371 (c)(1),
(2) Date: Mar. 30, 2016

(87) PCT Pub. No.: WO2015/048830
PCT Pub. Date: Apr. 9, 2015

(65) Prior Publication Data
US 2016/0227200 A1    Aug. 4, 2016

(30) Foreign Application Priority Data
Oct. 1, 2013 (EP) .................................... 13186948

(51) Int. Cl.
*H04N 15/00* (2006.01)
*H04N 13/04* (2006.01)
(Continued)

(52) U.S. Cl.
CPC ....... *H04N 13/0425* (2013.01); *H04N 9/3129* (2013.01); *H04N 9/3185* (2013.01);
(Continued)

(58) Field of Classification Search
CPC .......... H04N 13/0425; H04N 13/0445; H04N 13/0048; H04N 13/0497; H04N 13/0427;
(Continued)

(56) References Cited

U.S. PATENT DOCUMENTS

2004/0119004 A1* 6/2004 Wine ................. G02B 26/0841
250/234
2009/0315925 A1 12/2009 Tanaka
(Continued)

FOREIGN PATENT DOCUMENTS

WO    WO 2012113856    8/2012

OTHER PUBLICATIONS

European Office Action for Application No. 13186948.9-1903 dated Jan. 29, 2015.
(Continued)

*Primary Examiner* — Jared Walker
(74) *Attorney, Agent, or Firm* — Hoffmann & Baron, LLP (57) ABSTRACT

A light-emitting module for displaying or projecting a video signal comprises at least one mirror mounted so as to be able to oscillate and at least one light-emitting element, which is directed onto the mirror and is controllable via an input, and a computation unit that is connected to the light-emitting element and is configured to output at least one sample value of the video signal, which sample value appears at the input of said computation unit at a first time within a period of the mirror, at its output as a sample value at a second time, which is different from the first, within the same period according to a mapping function that is stored in the computation unit, wherein the computation unit has a control input that can be used to scale and/or offset the stored mapping function. The invention further comprises a display or projection apparatus having a multiplicity of such light-
(Continued)

emitting modules, and a method for calibrating the light-emitting module and the apparatus.

20 Claims, 8 Drawing Sheets

(51) Int. Cl.
*H04N 9/47* (2006.01)
*H04N 9/31* (2006.01)
*H04N 13/00* (2018.01)

(52) U.S. Cl.
CPC ..... *H04N 13/0048* (2013.01); *H04N 13/0418* (2013.01); *H04N 13/0427* (2013.01); *H04N 13/0445* (2013.01); *H04N 13/0497* (2013.01)

(58) Field of Classification Search
CPC ............. H04N 9/3129; H04N 13/0418; H04N 9/3185; H04N 9/3135; H04N 1/113; G02B 26/101; G02B 26/105; G09G 2320/0285
See application file for complete search history.

(56) References Cited

U.S. PATENT DOCUMENTS

2010/0079683 A1    4/2010  Kobori et al.
2010/0283413 A1*   11/2010 Richter ................ G02B 26/101
                                                          315/360

OTHER PUBLICATIONS

European Search Report for Application No. 13186948.9-1905 dated Mar. 27, 2014.
International Search Report for WO 2015/048830 dated Dec. 10, 2014.
International Preliminary Report on Patentability for PCT/AT2014/050216 dated Apr. 14, 2016 with English translation.

* cited by examiner

DISPLAY OR PROJECTION APPARATUS FOR A VIDEO SIGNAL, AND LIGHT-EMITTING MODULE AND CALIBRATION METHOD THEREFOR

CROSS-REFERENCE TO RELATED APPLICATIONS

This application is a National Phase application of International Application No. PCT/AT 2014/050216 filed Sep. 24, 2014 which claims priority to European Patent Application No. 13 186 948.9 filed Oct. 1, 2013, the disclosures of which are incorporated herein by reference.

FIELD OF INVENTION

The present invention relates to a light-emitting module for the display or projection of a video signal and to a display or projection apparatus having a plurality of such light-emitting modules. The invention also relates to a method for calibration of such a light-emitting module and to a method for calibration of such a display or projection apparatus.

BACKGROUND

A light-emitting module of this kind is known from US 2004/0119004 A1.

Display and projection apparatuses based on the deflection of emitted light rays in specific directions can be used for example as autostereoscopic displays. Such displays produce images that are perceived three-dimensionally by a viewer without the aid of 3D glasses. This technology is based on the fact that the image points of the display project different images in certain directions, and thus the left and right eye are each supplied with a different image. This method has already been implemented on a large scale by rigid lens systems. A new approach is that the deflection of the images in the various spatial directions is performed via a multiplicity of individually movable micromirrors and the respective image is projected onto said micromirrors only in corresponding phases of the mirror movements.

If a light beam is deflected by a mirror oscillating periodically about an oscillation axis, the projected light beam should provide all viewers at a certain distance from the display with information equally. However, this is generally not the case, since, as the mirror oscillates about an oscillation axis, there is a non-linear relationship between the trigonometric function of the oscillatory motion of the mirror and the position function of the projected light beams in the plane of the viewer. In addition there are also manufacturing tolerances, imperfections and misalignments of the display or elements thereof.

Another problem is that conventional autostereoscopic displays which have been set to an optimum viewing distance of the viewer from the display cannot be set to a different optimum viewing distance and therefore cannot be used flexibly.

SUMMARY

The object of the invention is to solve these problems and to provide light-emitting modules, display and projection apparatuses for video signals, and methods for calibration thereof.

In accordance with a first aspect of the invention the object is achieved with a light-emitting module for displaying or projecting a video signal, said module comprising: a support, at least one mirror mounted on the support, which mirror can be set periodically in oscillation about an oscillation axis by a drive, which drive is controllable by a control signal, at least one light-emitting element arranged on the support, directed at the mirror and controllable via an input, and a computation unit having at least one input and one output, which output is connected to the input of the light-emitting element, wherein the computation unit is configured to output at least one sample value of the video signal, which sample value appears at the input of said computation unit at a first time within a period of the mirror, at its output as a sample value at a second time within the same period, which second time is different from the first time, according to a mapping function that is stored in the computation unit, and wherein the computation unit has a control input, via which the stored mapping function for the video signal can be scaled and/or offset.

In accordance with the invention, for a light-emitting module, a function is therefore stored in the light-emitting module, which function "pre-distorts" the incoming video signal prior to transmission of a light pulse and deflection thereof in the time axis. As a result, non-linearities of the mapping of the deflected light pulses onto a plane caused by the oscillatory motion of the mirror, dependencies of the mapping on the position of the light-emitting module in the display, as well as any manufacturing tolerances and imperfections of the mirror, its drive and the light-emitting element, or faulty adjustments, such as angular error of the support on its base, of the mirror and of the light-emitting element relative to the support, etc. can be compensated for, and the light-emitting module can be optimally calibrated accordingly. The control input here enables a simple, dynamic change of the time distortion function of the light-emitting module in order to scale or alter the offset of the stored mapping function. As discussed in greater detail hereinafter, the mapping functions of many light-emitting modules, which together form an autostereoscopic display, can be adjusted or calibrated together in this way.

The time distortion ("time-warping") function stored in the computation unit can be implemented, for example, as an analytical (hardware or software) function, for example approximately as a Fourier series in a switching block or software module of the computation unit. In one embodiment of the invention, the mapping function can be implemented by an assignment table stored in the computation unit, said table having a multiplicity of entries each containing an assignment between a first and a second time. This allows for easier, but also more precise implementation of the mapping function, since the sampling cycle of the video signal is known and therefore an entry having a second time, for which mapping is to be performed, can be created for each sample value within a mirror period. In addition, each entry of the assignment table can be changed individually, which is not possible with a continuous function such as an above-mentioned Fourier series.

In an embodiment of the invention, the light-emitting element comprises at least one light-emitting or laser diode, e.g., three light-emitting diodes or laser diodes having different primary colors. Light emitting diodes (LEDs) or laser diodes (LDs) have particularly preferred properties such as a defined color spectrum, small size, high luminous efficiency, possibility of strong ray bundling by optical components of compact size, etc. Through the use of three light-emitting or laser diodes having primary colors, a targeted color mixing to build color 3D displays or projectors can be achieved. Here, the light-emitting module can have, for each light-emitting or laser diode of the light unit, both a private and a common mirror for deflecting the emitted light beams.

An optics is optionally arranged on the support, which optics shapes a light pulse emitted from the light-emitting element into a light fan in a plane parallel to the oscillation axis of the mirror. A divergent light signal can thus be collimated for example so as to form a light fan, or a light beam can be fanned so as to form a light fan. When a viewer in a viewer region wishes to receive a non-fanned light beam with the left eye and a non-fanned light beam with the right eye, said viewer should always be at the same level. Thus, both shorter and taller viewers can receive the light signal equally, or freedom of movement of the viewer in the vertical direction is not limited.

The mirror is more optionally formed as a MEMS (micro electromechanical system) mirror. This allows a maximum miniaturization of the light-emitting module, and thereby the construction of a 3D display or 3D projector from a plurality of light-emitting modules, i.e. a high spatial density of image points (pixels).

In accordance with a second aspect the invention provides a display or projection apparatus having a plurality of light-emitting modules of the type presented here which are arranged in an array to form an autostereoscopic display or a 3D projection apparatus.

The light-emitting modules are optionally contained in the aforementioned array at regular intervals in rows and columns, as is known in the art; this allows easy processing of the video signal for images that are to be displayed or projected.

It should be noted that the light-emitting modules and projection apparatuses presented here are also suitable for purposes other than stereoscopic displays, for example for constructing direction-dependent displays, which display different contents depending on the position of the viewer ("multi content"), or for constructing directional controllable illumination devices, which project light in selected directions, for example for the construction of controllable car headlights having directional luminous reflectors, for example for adaptive headlights.

It is particularly advantageous if light-emitting modules of the aforementioned embodiment having a control input for use of the mapping function are used, wherein a further computation unit common to the light-emitting modules and having an input and a multiplicity of outputs is provided, each of which is connected to the control input of the computation unit of a light-emitting module, and wherein the further computation is configured, for each light-emitting module depending on the respective position thereof in the array and/or a target distance predetermined at the input thereof, to determine a scaling and/or offset value and to output this value at the corresponding output.

This creates a display or projection apparatus or a display which can adapt the mapping functions of all light-emitting modules to a target distance and thus can be set at any moment to a desired viewing distance different from the calibration distance.

The above-mentioned display or projection apparatus for a video signal comprising at least two image channels is optionally characterized in that the light-emitting modules are arranged downstream of a demultiplexer which is configured to supply, within a mirror period, each light-emitting module with portions from different image channels intended for this light-emitting module in a predetermined sequence.

The display can thus be supplied with a common video signal which contains several (at least two) image channels per light-emitting module. With two image channels, two viewing zones (one for the left eye and one for the right eye) can be established, which can also be repeated periodically over the observer area. With more than two image channels, periodically repeating sequences of a plurality of viewing zones can be created transversely across the observer area, wherein a sequence of image channels for example contains consecutive viewing angles of a 3D scene, as known in the art. The video signal may contain the individual image channels per light-emitting module, or the individual light-emitting modules per image channel, for example in any time multiplex, and the demultiplexer may demultiplex the video signal accordingly in order to supply it to the individual light-emitting modules at the correct time.

In a third aspect the invention provides a method for calibrating a light-emitting module of the type presented here in the embodiment with a mapping function implemented by an assignment table, comprising: a) setting the mirror in oscillation about an oscillation axis with a mirror period; b) feeding an electrical pulse at a known time within a mirror period into the input of the computation unit; c) measuring the path position of a light pulse on a path, the light pulse being emitted from the light-emitting unit according to the electrical pulse and deflected by the mirror; d) storing the known time, relative to the mirror period, as a second time in an entry of the assignment table, and storing a time value corresponding to the measured path position, relative to the mirror period and a distance, as a first time of this entry; e) repeating the steps b) to d), either individually or in their overall sequence, for at least one further electrical pulse at another known time, which is different from the known times, relative to the mirror period, of the previous pulses; and f) receiving a scaling value and/or an offset value at the control input of the computation unit for scaling or offsetting the mapping function.

The hardware-transfer characteristic curve of the entire mapping system of the light-emitting module consisting of support, light-emitting module, mirror, and projection or measurement position is thus measured pointwise and—by correspondingly inverse storage in the assignment table—inverted at the same time to that mapping function implemented by the assignment table by which the video signal is then pre-distorted temporally by the computation unit.

The method of the invention thus permits a rapid calibration of the light-emitting module by direct creation or adaptation of the assignment table to the individual projection properties of the light-emitting element, of the mirror and their positions and orientations relative to the viewing or projection plane. In contrast to a mere "pre-calculation" of the assignment table, for example to compensate only for the projection-angle-dependent tangent non-linearity of the system, for which purpose the mapping function, for example, is simply modeled as an arc tangent, this has the advantage that each light-emitting module can be calibrated individually to compensate for its manufacturing and assembly tolerances. The measurement of the path position of the deflected light pulse indicates how significantly this is removed from its ideal "target position". By means of the known duration of the period of oscillation of the mirror and the known positions of the light pulse at maximum mirror deflection, the measured path position can be assigned a time value that can be used directly to establish the assignment table, i.e. the time distortion of the video signal in the computation unit of the light-emitting module.

The path over which the light pulse is measured can be of any kind here, as discussed below in greater detail, for example a straight line on a screen onto which the light pulses are projected, or a path in space along which a camera is moved, etc. The path should expediently extend such that it is penetrated by light pulses of all possible angles at which said pulses can be deflected by the mirror.

In step b) the pulse is optionally fed repetitively over a plurality of mirror periods, each at said known time relative to the respective mirror period. With projection of the light pulses onto a screen, the path position of the light pulses can thus be detected and measured, for example with the naked eye; with movement of a light detector along the path it is thus possible to ensure that the light detector receives at least one of the light pulses when the detector passes the path position thereof. Moreover, where appropriate, a light pulse can be measured not only once, but several times until a sufficiently accurate measurement result is present, for example to compensate for measurement errors caused by a multiplicity of measurements.

In a further embodiment of the invention further entries in the assignment table are added by interpolating existing entries. Since during calibration the electrical pulses are fed into the light-emitting module at discrete time intervals at known times, but the light pulses are projected onto an arbitrary path position and this path position is converted in a first time of an entry of the assignment table, a direct temporal assignment of a distance value of the input video signal "to be pre-distorted" temporally at a first time in the assignment table is not always possible during the subsequent operation of the light-emitting module. In this case it is favorable to generate intermediate entries in the assignment table by interpolation. The interpolation can be carried out here both during running operation in real time from the existing stored entries, or in advance by filling the table with interpolation values following the calibration phase. Interpolated entries may also be useful if an insufficient amount of entries was created in the assignment table, for example, if points could not be measured.

In yet another advantageous embodiment of the invention the known times of the fed pulses are spaced from one another in time according to the sampling period of the video signal and cover a mirror period. This allows the entire mapping function of the light-emitting module to be created in a single operation, wherein further entries can be calculated optionally by interpolations as described above in order to increase the temporal resolution of the assignment table.

In an alternative embodiment of the invention the known times of the fed pulses within a mirror period are spaced from one another in time according to a multiple of the sampling period of the video signal, and the process is repeated while varying the known times until these cover the mirror period corresponding to the sampling rate of the video signal. In this variant a high temporal resolution of the mapping function is achieved by "interleaving" slightly temporally staggered pulse sets; the time intervals between the pulses in a mirror period may thus remain large, which facilitates the detection of the path positions thereof: with barely spaced light pulses there may otherwise be overlapping between the contact points over the measurement path, which prevents an accurate measurement of the path position.

In a first variant of the invention the path position is measured in step c) by projecting the light pulse onto a screen and measuring on the screen with respect to a path extending approximately horizontally across the screen. This provides a simple method for measuring the projection pattern of a light-emitting module. The screen can be opaque or semi-transparent here to allow an evaluation from both sides of the screen. The mapped pattern can be evaluated either with the naked eye and measurement with a ruler on the screen or by means of photographing or filming of the screen using a camera and automatic image processing of the image or images of the camera. With a multiplicity of light-emitting modules, for example in a display, the same screen can be used to calibrate all light-emitting modules in succession.

In a second variant of the invention the path position is measured in step c) by moving a light detector along the path and measuring the detection location of the light pulse on the path. This has the advantage that no screen has to be positioned and thus a calibration can be carried out quickly and flexibly.

Moreover, the aforementioned embodiment of the pulse-contact point measurement in accordance with a fourth aspect of the invention provides a method for calibrating a display and projection apparatus from a multiplicity of light-emitting modules in a single step by using a camera as light detector, by means of which an image of all light-emitting modules is recorded at successive locations and times along the path. The light pulses of all light-emitting modules can be detected in the recorded images in order to calibrate each light-emitting module in the specified way. The assignment tables of all light-emitting modules of a display thus can be determined in a single calibration step, i.e. in parallel so to speak. The camera can be of any type, for example also merely a camera of a mobile phone, provided it has a sufficient time resolution for the recorded sequence of images and a sufficient image point or pixel resolution for the detection of each individual light-emitting module.

The path can optionally be referenced to at least one reference light-emitting module by means of said module, which emits light pulses of known position. The path can thus be determined without auxiliary means on the camera side, and even the display requires no change when one or more of its light-emitting modules is/are calibrated in advance as a reference light-emitting module, for example. Alternatively, a separate "precision light-emitting module" can be used as reference light-emitting module, which is configured to emit light pulses in precisely predetermined directions.

In accordance with a further optional feature of the invention the speed and/or acceleration of the camera along the path can be determined by comparing the images of said camera with the images of another camera, which is mounted at a fixed distance from the first-mentioned camera. Because the image acquisition rate of the camera is known, for example 25 images per second, the local movement speed can be determined by recognizing an image, recorded by the first camera of the camera pair, in the image sequence of the second camera of the camera pair when this is moved along the path and records the display, and each image can thus be assigned a path position. This may be implemented using an appropriate image processing software for the automatic evaluation of the camera image sequences.

Yet another possibility is to determine the path by means of an inertial sensor and/or a satellite navigation device of the light detector. This enables an accurate, direct assignment of the recorded images to a location, wherein components are used as are already built into modern smartphones, for example, and of which the camera can be used as a light detector.

The various variants of determining the path, such as inertial sensor, satellite navigation device, the reference light-emitting module, and camera pair with image analysis software, can also be combined in order to increase the measurement accuracy.

BRIEF DESCRIPTION OF THE DRAWINGS

The invention will now be described with reference to exemplary embodiments illustrated in the accompanying drawings. In the drawings.

DETAILED DESCRIPTION

Figure 1:
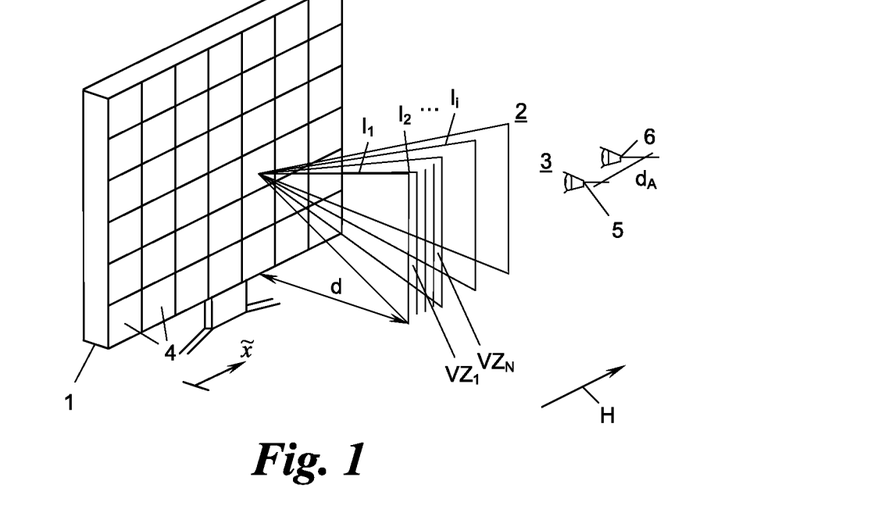
FIGS. 1 and 2 show a display or projection apparatus according to the invention and the beam paths thereof schematically in a perspective view (FIG. 1) and in a plan view (FIG. 2).

FIG. 1 shows a display or projection apparatus, configured as an autostereoscopic display 1, which projects a three-dimensional image onto an observer area 2 in which a viewer 3 is located. The display 1, instead of a single three-dimensional image, can also produce a three-dimensional video by a series of three-dimensional images.

The display 1 comprises a multiplicity of regularly spaced light-emitting modules 4, which for example are arranged in an array of 360 rows and 672 columns. Each light-emitting module 4 is assigned a horizontal position (column position) x̃ at the display 1, which is determined from any point of the display 1 in a horizontal direction H. It is understood that the display 1 may contain any number of light-emitting modules 4 in any arrangement, even in very small number or resolution of, for example, 5×5 or 10×10, for example so as to be able to also form a direction-angle-dependent illumination device, for example an adaptive headlight for vehicles. A light-emitting module 4 in the array is perceived by a viewer 3 as a (stereo) image point or pixel, as explained below.

Figure 2:
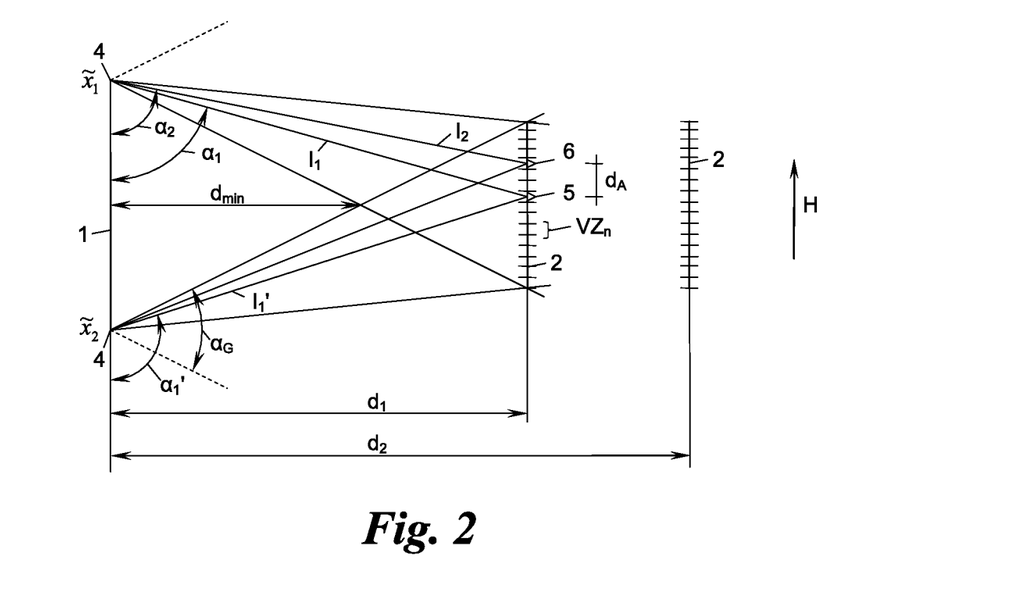

For this purpose, each light-emitting module 4 is configured to project a plurality of light beams (light pulses) $I_1, I_2 \ldots$, generally $I_i$, at different angles, $\alpha_1, \alpha_2$, generally $\alpha_i$, (FIG. 2), which are enclosed by the display 1 and a vertical plane in which the light beam $I_i$ lies. So that the display 1 can be viewed by viewers 3 of different height and from different viewing locations in the observer area 2, the light pulses $I_i$ can also be shaped into light fans that lie in vertical planes; light beams and light fans are collectively referred to hereinafter as a light pulse $I_i$. For example, a left eye 5 of the viewer 3 thus receives a light pulse $I_1$ at an angle $\alpha_1$ and a right eye 6 receives another light pulse $I_2$ at an angle $\alpha_2$ from the same light-emitting module 4 (FIG. 2). Due to the light-emitting modules 4 as a whole, the left eye 5 receives a different two-dimensional image from the display 1 compared with the right eye 6, whereby the viewer 3 perceives a three-dimensional image.

In practical embodiments of the display 1, however, the light-emitting modules 4 project not only two different images over their entire beam angle $\alpha_G$, but a multiplicity of different images for viewing zones $VZ_1, VZ_2, \ldots, VZ_n, \ldots, VZ_N$, which are repeated periodically in the horizontal direction H over the beam angle $\alpha_G$ and the observer area 2. A viewing zone $VZ_n$ can contain one or more light pulses $I_i$ of a light-emitting module 4. Thus, with a typical viewing distance $d_A$ of 6.3 cm, thirty different viewing zones $VZ_1, \ldots, VZ_{30}$ for example, i.e. thirty images that can be perceived as being different, are distributed over a horizontal extension of 63.0 cm, this sequence of viewing zones $VZ_1, \ldots, VZ_{30}$ being repeated every 63.0 cm. In this example, the viewer 3 receives, for example with the left eye 5, the viewing zone $VZ_1$ and with the right eye 6 the viewing zone $VZ_4$; with a small movement of the viewer 3 to the right, the viewer's left eye 5 for example receives the viewing zone $VZ_2$ and the viewer's right eye 6 receives the viewing zone $VZ_5$, and so on and so forth. If the viewing zones $VZ_1, \ldots, VZ_{30}$ represent a 3D scene consisting of thirty slightly different viewing angles, this results in a realistic 3D perception for the viewer 3 without significant image jumps as the viewer's head moves. By periodic repetition of the viewing zones $VZ_1, \ldots, VZ_N$ over an observer area 2 with a width of, for example, 10 m, about 475 pictures are thus generated over the beam angle of the light-emitting modules 4.

As can also be seen in FIG. 2, a viewer 3 receives with his left eye 5 the light pulse $I_1$ of a first light-emitting module 4, which is located at a horizontal position $\tilde{x}_1$ on the display 1, at an angle $\alpha_1$, and the light pulse of another light-emitting module 4 located in another horizontal position $\tilde{x}_2$ from another angle $\alpha_1'$, which means that the viewing zones $VZ_n$ of the different light-emitting modules 4 are also correlated with one another in order to represent precisely the correct viewing zone $VZ_n$ at a certain time at a certain location (for example left eye 5) of the observer area 2.

The minimum distance $d_{min}$ at which a viewer 3 can be located in order to be able to perceive light pulses $I_i$ of all light-emitting modules of the display 1 is determined here by the start of the area in which light pulses $I_i$ of all light-emitting modules 4 can overlap. To be able to adapt the width of the viewing zones $VZ_n$ to a predetermined viewing distance $d_A$ of a viewer 3 at a certain viewing distance d, the deflection angle $\alpha_i$ of the light pulses $I_i$ for different viewing distances $d_1$, $d_2$ can be reduced or enlarged optionally, whereby the display 1 can be calibrated to a desired viewing distance d.

Figure 3:
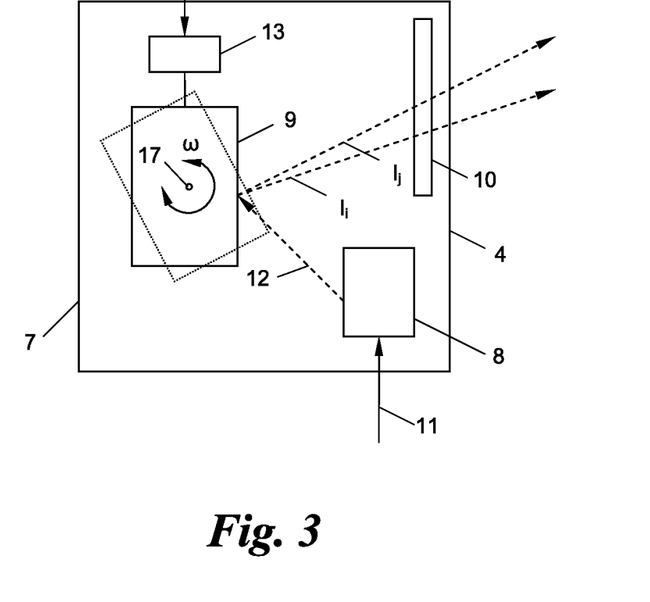
FIG. 3 shows a block diagram of a single light-emitting module of a display or projection apparatus according to the prior art.

In FIG. 3 a light-emitting module 4 according to the prior art is shown. The light-emitting module 4 comprises a support 7, on which a light-emitting unit 8, a movably mounted mirror 9 and an optics 10 are arranged in mutually defined spatial relationships. The light-emitting unit 8 comprises one or more light-emitting or in particular laser diodes, preferably of different primary colors, for example red, green and blue. Alternatively or additionally, a plurality of light-emitting or laser diodes are used for enhanced performance. The function of the light-emitting unit 8 will be explained on the basis of a light-emitting or laser diode; it is understood that the discussed components can be multiplied accordingly for a plurality of light-emitting or laser diodes.

The light-emitting unit 8 converts a video signal 11 having a sequence of electrical pulses $E_1, E_2, \ldots$, generally $E_i$, (FIG. 4) into a light signal 12 having a sequence of optical pulses $I_1, I_2, \ldots$, generally $I_i$, which are reflected by the moving mirror 9 and are distributed over the beam angle $\alpha_i$ (FIG. 2) in the form of the light pulses $I_i$ (FIG. 1). An (optional) optics 10, which is arranged in the beam direction before or after the mirror 9, can shape the light pulses $I_i$ into a light fan, as shown in FIG. 1.

If the light pulses $I_i$ are emitted as convergent "beam bundles" by the light-emitting element 8, these can be fanned out by the optics 10 in a spatial dimension in order to generate light fans which lie in vertical planes. However, the light pulses $I_i$ are optionally collimated by an optics 10 in the form of, for example, an FAC (fast axis collimator) lens so as to form the light fans, if the light pulses $I_i$ are divergently emitted by the light-emitting element 8. In the latter embodiment, the light pulses $I_i$ are optionally collimated before deflection by the mirror 9, that is, the optics 10 is located between light-emitting element 8 and mirror 9 (not shown in FIG. 3).

The optics 10 may for this purpose be of any type known in the prior art, for example a combination of one or more refractive elements such as converging or diverging lenses and/or one or more diffractive elements such as diffraction grating or the like.

A drive 13, which sets the mirror 9 in an oscillatory motion, is controlled by a control signal 14, for example having a sawtooth profile, in order to effect a sawtooth oscillation of the mirror 9, which results in a corresponding pivotal movement of the light pulses $I_i$ over the observer area 2. The drive 13 can be of the electromagnetic, electrostatic, electrothermal and/or piezoelectric type depending on requirements and may comprise driver electronics, which are necessary in any case for this purpose.

The incoming video signal 11 comprises, for each viewing zone $VZ_n$ to be projected, an image channel $BK_n$, which, for the light pulses $I_i$ to be output into this viewing zone $VZ_n$, contains corresponding electrical pulses $E_i$ for controlling the light-emitting unit 8.

Figure 4:
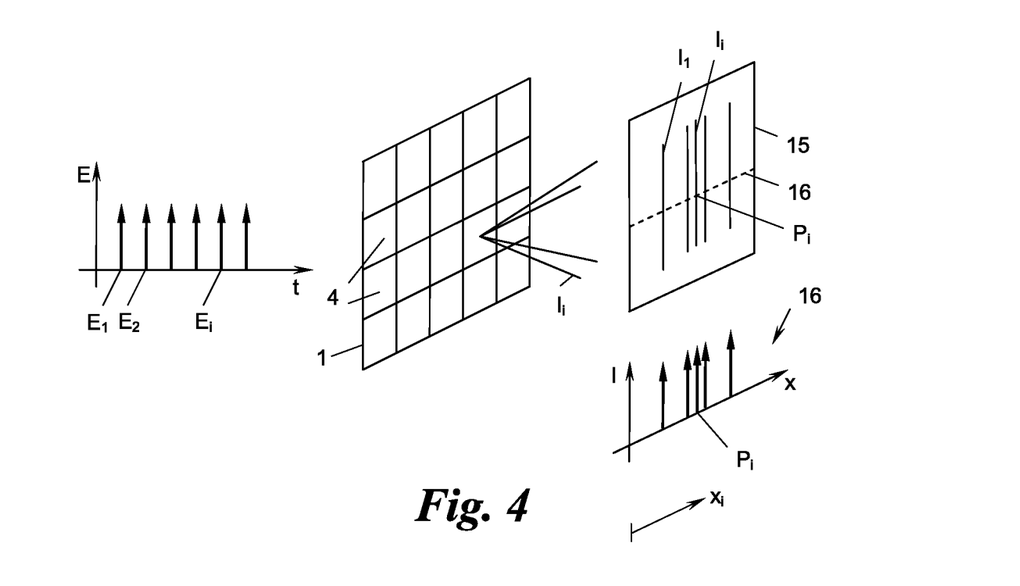
FIG. 4 shows a schematic pulse and ray diagram of the light-emitting module of FIG. 3.

FIG. 4 shows the conversion and projection of the electrical pulses $E_i$ by the light-emitting module 4 as light pulses $I_i$ in an approximately vertical plane 15 in the observer area 2. The plane 15 may be a projection screen or just an imaginary (virtual) plane of observation, in which the viewer 3 is located. With electrical pulses $E_i$ fed at regular time intervals and with a substantially constant angular velocity co of the oscillatory motion of the mirror 9, an oscillatory motion results in an irregular distribution of the light pulses $I_i$ over the plane 15 along a viewed path 16, which extends in a skewed manner relative to the oscillation axis 17 of the mirror, for example horizontally in the plane 15. The contact points $P_i$ of the light pulses $I_i$ on the path 16 here follow—due to the geometry of the projection in a plane (FIG. 2)—substantially a tangent distribution with an accumulation in the middle. By means of irregularities and non-linearities of the mirror movement, however, such as heavy and light oscillations of the mirror 9, and maladjustments of the mirror 9 and/or of the light-emitting element 8 relative to the support 7 or the light-emitting modules 4 in the display 1, the distribution of the contact points $P_i$ at the observer area 2 along the path 16 additionally deviates from a "pure" tangent distribution. If the light-emitting element 8 comprises a plurality of light-emitting or laser diodes, the irregularities and non-linearities just described may be different for each light-emitting or laser diode.

Figure 5:
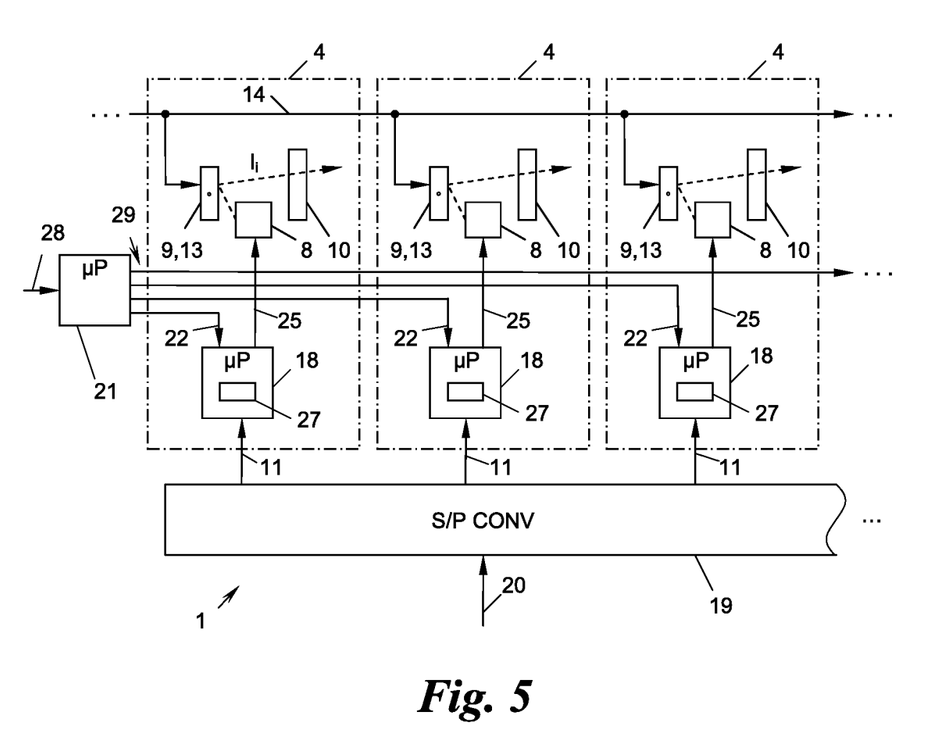
FIG. 5 shows a block diagram of a display or projection apparatus according to the invention.

The apparatuses and methods now described hereinafter overcome these problems. FIG. 5 shows a display 1 according to the invention having a plurality of light-emitting modules 4 according to the invention (only three are shown by way of example in block diagram form). Like reference signs designate the same elements as in FIGS. 1-4. In particular, each of the light-emitting modules 4 is constructed as shown in FIG. 3 (the support 7 has not been shown here for the purpose of clarity), with the following changes.

The light-emitting module 4 here contains a computation unit 18, via which the video signal 11 of the light-emitting unit 8 is fed and which temporally "pre-distorts" the video signal 11 in a manner described in greater detail below in order to compensate for the mapping errors sketched in FIG. 4. All light-emitting modules 4 and computation units 18 are arranged downstream of a common series/parallel converter (S/P converter) 19, which decouples from and feeds to each light-emitting module 4 the relevant video signal 11 of a time multiplex signal 20 fed to the entire display 1. It is understood that, instead of the S/P converter 19, any other demultiplexer or a display drive circuit can also be used which is capable of feeding the individual light-emitting modules 4 in the correct order with the video signals 11 contained in a series or parallel 3D video signal having two or more image channels for different viewing zones $VZ_n$.

A further computation unit 21 common to all light-emitting modules 4 is connected to control inputs 22 of the computation units 18 of the light-emitting modules 4 in order to influence these together, as will be explained in greater detail hereinafter.

It is understood that the computation units 18, the common further computation unit 21 and the S/P converter 19 can be realized both by separate and common computation means, more specifically both by hardware modules as well as by appropriate software modules. Thus, all computation means and computation steps described here run for example on a single suitably programmed graphics processor chip that controls the display 1.

Furthermore, the drives 13 of the mirror 9 can either all be driven by the same control signal 14 or via a private, individual control signal (not shown).

Figure 6:
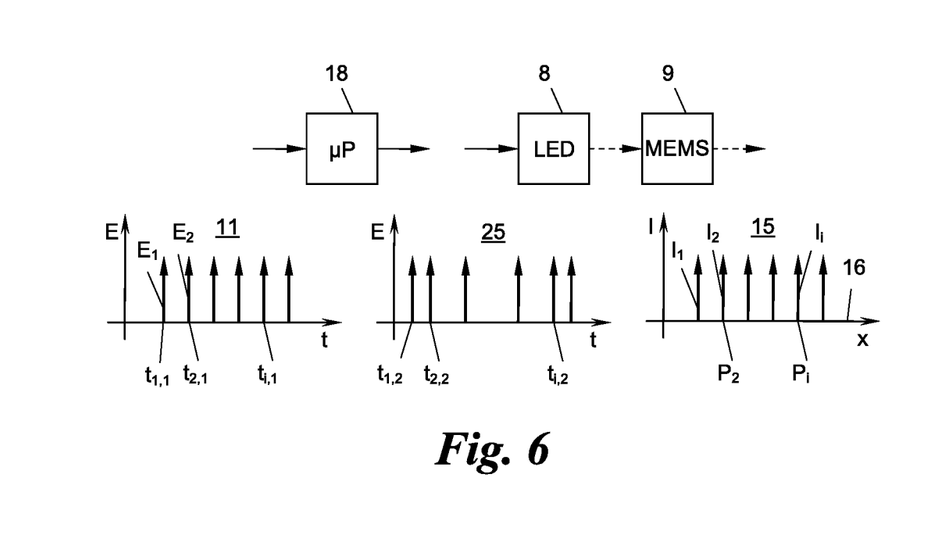
FIG. 6 shows time graphs of pulse signals occurring at various points in a light-emitting module of the apparatus of FIG. 5.

FIGS. 6 to 9 show the operation of the computation units 18 in detail. In each computation unit 18 a time distortion or mapping function 23 is implemented, which assigns an electrical pulse or sample value $E_i$ of the input signal 11 of the light-emitting module 4 arriving at a first time $t_{i,1}$ within a mirror period $\tau$ to a second time $t_{i,2}$ within the same mirror period $\tau$, see mapping arrow 24 in FIG. 7. At the output of the computation unit 18, there is thus produced a video signal 25 which has been time-distorted in accordance with the mapping function 23 and which is fed to the light-emitting element 8 (FIG. 6). If the mapping function 23 is properly adjusted (calibrated), a regularly spaced sequence of light pulses $I_i$ or contact points $P_i$ thereof is thus produced at the output of the entire optomechanical mapping system consisting of light-emitting element 8 and oscillating mirror 9, here the plane 15, on an approximately horizontal viewing path 16, when the video signal 11 contains regularly spaced pulses $E_i$. If the light-emitting element 8 as discussed comprises a plurality of light-emitting or laser diodes, a private mapping function 23 can be implemented in the computation unit 18 for each light-emitting or laser diode, or a private computation unit 18 can be provided in each case with a private mapping function 23.

Figure 7:
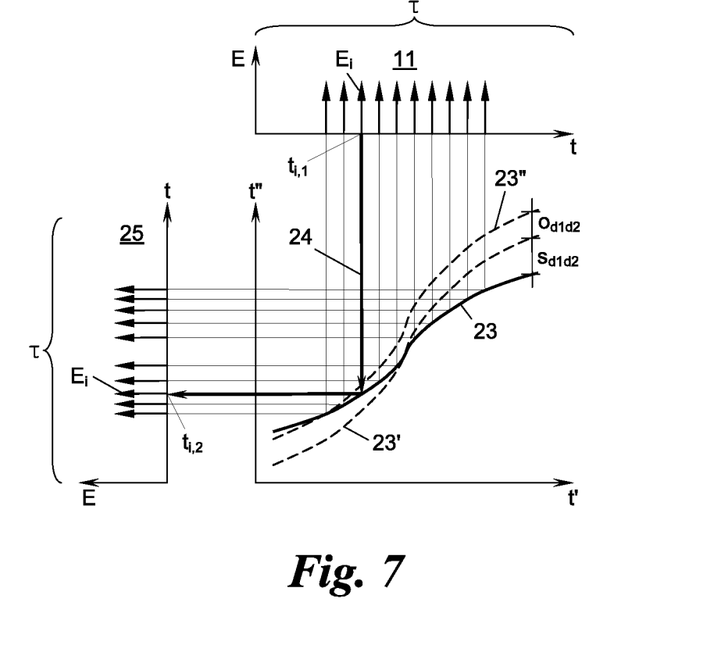
FIG. 7 shows the mapping function of the computation unit of a light-emitting module of the apparatus of FIG. 5.
Figure 8:
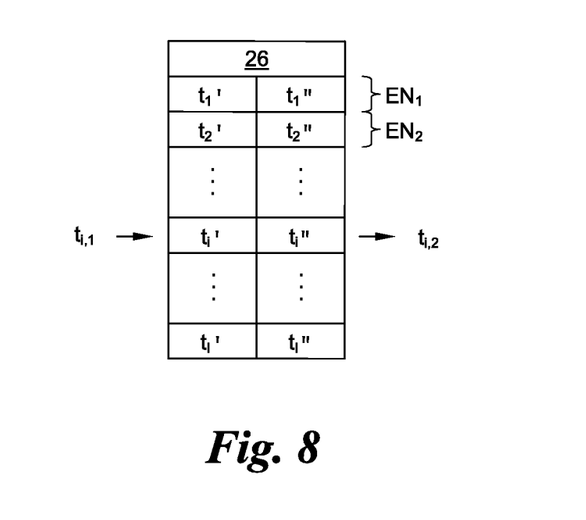
FIG. 8 shows an assignment table stored in the computation unit of a light-emitting module for implementation of the mapping function of FIG. 7.

The mapping function 23 may be realized for example by means of the characteristic curve(s) of appropriate electronic hardware components in the computation unit 18. In the simplest case the mapping function 23 is an arc tangent function, which compensates for the geometrically induced tangent distortion of the pulse deflection via an oscillating mirror onto a plane. However, so as to be able to also compensate for the above-mentioned light-emitting module-specific tolerances of the light-emitting unit 8, mirror 9, drive 13, etc. individually for each light-emitting module 4, the mapping function 23 is optionally a characteristic curve, for example stored as an assignment table 26 in a memory 27 of each light-emitting module 4. FIG. 8 shows an example of such an assignment table 26, which implements the mapping function 23 in the computation unit 18. Each entry $EN_1$, $EN_2$, ..., generally $EN_i$, in the assignment table 26 contains a time pair consisting of a first time $t_i'$ and an assigned second time $t_i''$ in order to enable the computation unit 18 in each mirror period τ to perform the explained time distortion of the video signal 11 to give the pre-distorted video signal 25.

From FIG. 5, the (optional) further computation unit 21 can also be seen, by means of which the mapping functions 23 of all light-emitting modules 4 can be adjusted simultaneously, but individually. This can be used in particular to set the entire display 1 to a new optimum viewing distance $d_2$ (FIG. 2).

From the geometry shown in FIG. 2, for a display 1 having horizontal rows and vertical columns of light-emitting modules 4 for a light-emitting module and two different mapping functions 23, denoted here as $X_{d1}(t)$ and $X_{d2}(t)$ for two different viewing distances $d_1$ and $d_2$, the following relationship can be established:

$$X_{d2}(t) = \frac{d_2}{d_1} \cdot X_{d1}(t) + \tilde{x} \cdot \left(1 - \frac{d_2}{d_1}\right)$$

$$X_{d2}(t) = s_{d1d2} \cdot X_{d1}(t) + o_{d1d2}$$

wherein $\tilde{x}$ is the position of the observed light-emitting module 4 in a horizontal direction along the display 1. The terms $$s_{d1d2} = \frac{d_2}{d_1}$$

and $$o_{d1d2} = \tilde{x} \cdot \left(1 - \frac{d_2}{d_1}\right)$$

can be considered here respectively as an individual scaling value $s_{d1d2}$ and offset value $o_{d1d2}$ for the mapping function 23 of the respective light-emitting module 4.

The further computation unit 21 then receives, for example at a control input 28, the desired new viewing distance $d_2$ and calculates all individual scaling values $s_{d1d2}$ and offset values $o_{d1d2}$ for the light-emitting modules 4 and feeds these via a multiplicity of outputs 29.

The computation units 18 of the light-emitting modules 4 receive the respective scaling values $s_{d1d2}$ and offset values $o_{d1d2}$ and resize or move their stored mapping functions 23 (characteristic curves X(t) or assignment tables 26), see the dashed curves 23', 23" in FIG. 7. Each light-emitting module 4 is now set individually—depending on the array position $\tilde{x}$ thereof in the display 1—to the new optimal viewing distance $d_2$ without the need for a new mapping function 23 to be stored in its computation unit 18. The display 1 can thus be set in a single step to a desired new optimal viewing distance $d_2$.

Figure 9:
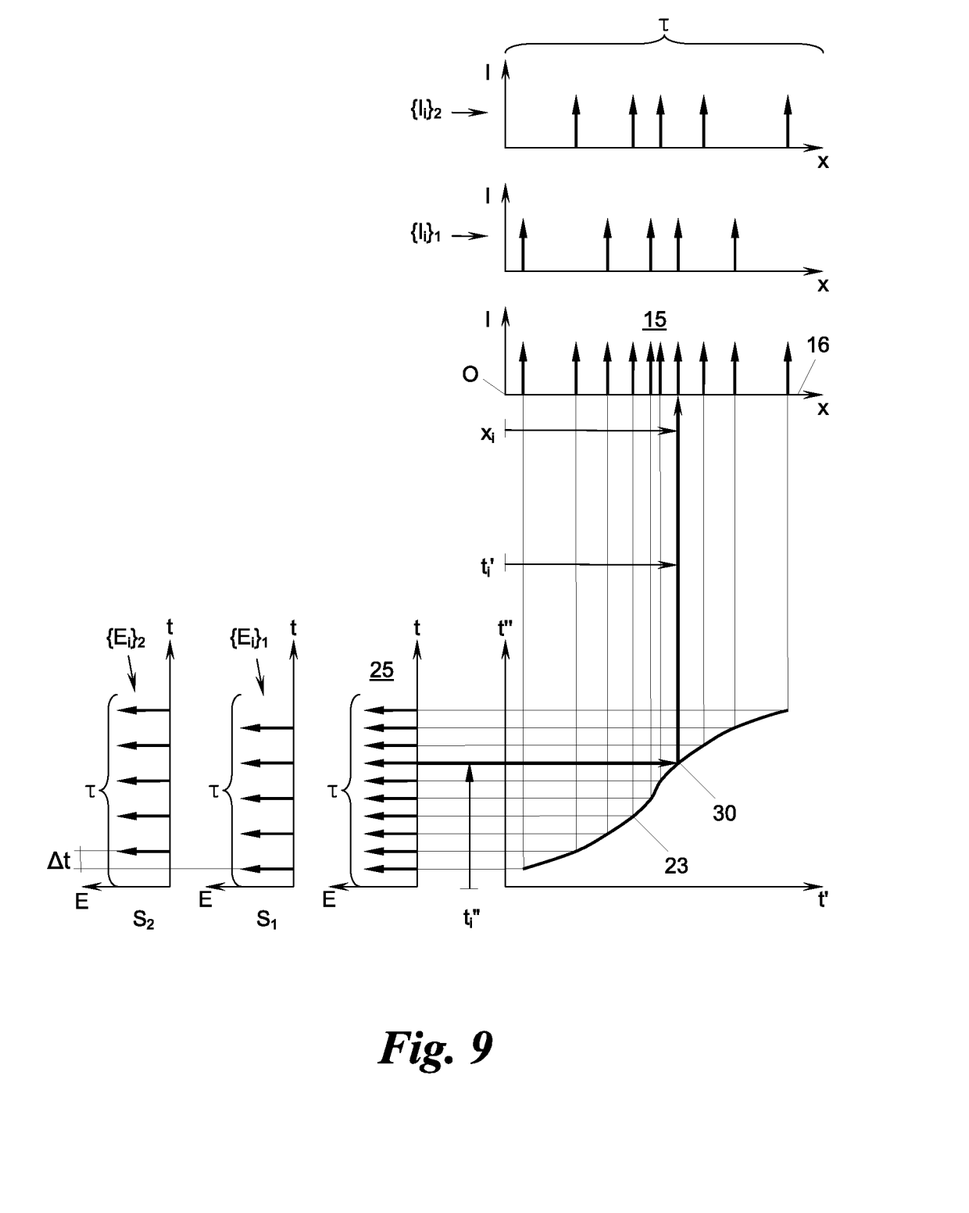
FIG. 9 shows the step of creating a mapping function or assignment table for the light-emitting module of FIGS. 5 to 8 within the scope of the calibration method of the invention.

FIG. 9 shows an overview of a method for creating the assignment table 26, and thus for calibrating a light-emitting module 4 of the display 1. For this, a video signal 25 having periodic electrical pulses $E_i$ is fed directly into the light-emitting element 8. The number of pulses $E_i$ per mirror period T determines here the accuracy of the method that can then be attained. The position $x_i$ of the contact point $P_i$ of the generated light pulse $I_i$ over the path 16 is measured for each electrical pulse $E_i$. The path position $x_i$ of the contact point $P_i$ is measured over the path 16 in respect of a common reference point O, which for example is the point over the path 16 at which the very first pulse $E_i$ in a mirror period T is projected. The path position $x_i$ of the contact point $P_i$ is now converted into a ("first") time value $t_i'$ in a time scale t', which results from the fact that the local span of all possible pulses $E_i$ or $I_i$ should correspond to the temporal mirror period should T.

The time equivalent $t_i'$ of the path position $x_i$ of the light pulse $I_i$ one hand and the known time $t_i''$ (modulo of the mirror period T) of the electrical pulse $E_i$ on the other hand, i.e. the value pair $(t_i', t_i'')$, define a measurement point 30 of the mapping function 23 in the time/time plane t'/t" and can be stored at the same time as an entry $EN_i$ in the assignment table 26.

The process is carried out for as many pulses $E_i$ as possible distributed over the entire mirror period T to create as many points 30 of the mapping function 23 or entries $EN_i$ in the assignment table 26 as possible. Other (interim) entries $EN_i$ in the assignment table 26 can then be created by interpolating existing entries $EN_i$, and can be pre-computed and stored in the assignment table 26, and also generated only in real time during operation of the computation unit 18, when, for a sample value of the video signal 11, a matching entry $EN_i$ is required at a "first" time t' within the mirror period T and is not available (pre-stored).

Figure 15:
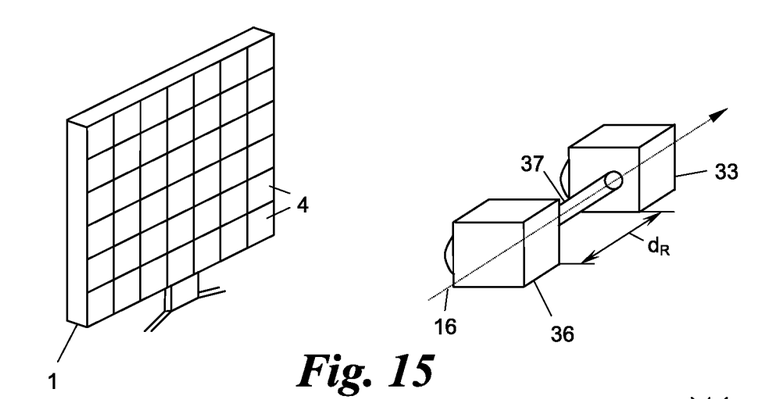

FIG. 9 also shows the optional measure of increasing the achievable measurement accuracy when measuring the path positions $x_i$ by "interleaving" a plurality of pulse sets $\{E_i\}_1$, $\{E_i\}_2$, ... which are slightly offset in different phases $S_1$, $S_2$, ... of the method successively by small periods Δt with larger pulse intervals. Due to the width of the light pulses $I_i$ in the viewing plane 15, which width in reality is not "ideally linear", the spatial intensity distributions with too scarce a sequence of the electrical pulses $E_i$ overlap so that their path positions $x_i$—for example as locations of intensity maxima of the light pulses $I_i$— no longer can be accurately determined or are unassignable. Due to the larger pulse intervals in the electrical pulse sets $\{E_i\}_1$, $\{E_i\}_2$, ... in the measurement phases $S_1$, $S_2$, ..., sufficient distances in each light pulse set $\{I_i\}_1$, $\{I_i\}_2$, ... can be reached over the path 16 so as to be able to determine the path positions $x_i$ more easily.

In all the described embodiments, an electrical pulse $E_i$ at a respective time $t_i''$, based on the mirror period $\tau$, can be fed only once into the light-emitting element 4, resulting in a flash of the respective light pulse $I_i$ at the path position $x_i$, or periodically over a plurality of mirror periods $\tau$ so as to be able to measure the path positions $x_i$ of the light pulses $I_i$ over a longer period of time.

The mapping function 23 or assignment table 26 may also be determined, instead of by the method shown in FIG. 9, by an iterative process, for example by testing and adapting different values by a Monte Carlo method.

The path positions $x_i$ of the light pulses $I_i$ of a light-emitting module 4 can in each case be determined both individually, separately for each light-emitting module 4 as well as once in a single step for all light-emitting modules 4 of the display 1, as will now be explained with reference to FIGS. 10 to 16. It is understood that, with a plurality of light-emitting or laser diodes per light-emitting unit 8, for example for different primary colors, the method described hereinafter can be carried out for each light-emitting or laser diode of the light-emitting element 8 in succession—or for example even when using the appropriate color filter or color-selective sensor elements in a light detector at the same time.

Figure 10:
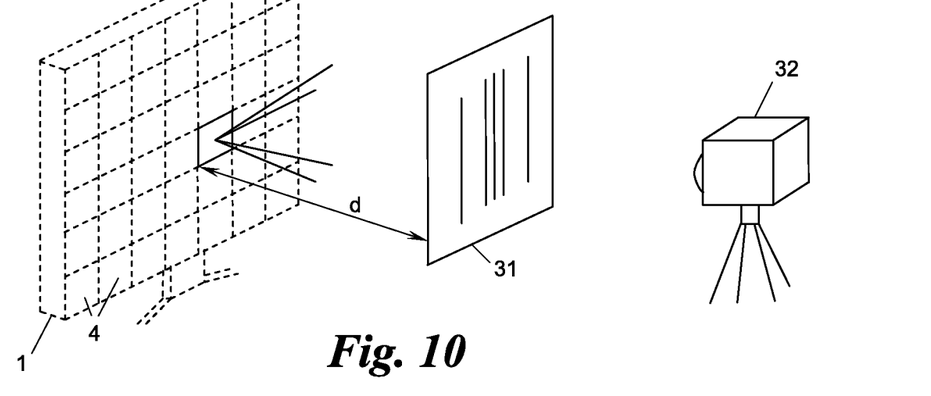
FIG. 10 shows a schematic perspective view of a first embodiment of the calibration method of the invention on the basis of the components involved.

FIG. 10 shows an embodiment in which each light-emitting module 4 is calibrated individually. For this purpose, a stationary shield 31 is placed at the desired calibration distance d from the display 1, optionally parallel thereto. The light line pattern of light pulses $I_i$ generated by a single light-emitting module 4 when feeding the calibration video signal 25 of FIG. 9 on the screen 31 optionally with the mirror period $\tau$, is recorded using a stationary recording device 32, such as a 2D-camera, a line (1D) photodetector, etc.

In the recorded image of the recording device, the contact points $P_i$ and thus the path positions $x_i$ of the light pulses $I_i$ along the viewing path 16—for example a horizontal straight line on the screen 31 for light-emitting modules 4 with a vertical oscillation axis 17—are detected for example by means of electronic image processing. This procedure is then repeated for all other light-emitting modules 4 of the display 1.

Instead of a stationary recording device 32, which records all path positions $x_i$ at the same time, a mobile light detector 33 can also be used, which is moved along the path 16 in order to record the path positions $x_i$ pointwise in succession over time; the path 16 then represents the trajectory of such a mobile light detector 33. FIGS. 11 to 16 show embodiments of the method which are based on the use of such a light detector 33 moved along the path (trajectory) 16 are capable here of calibrating all light-emitting modules 4 at the same time and thus the display 1 in one step.

For this purpose, a light detector is used in the form of a camera 33, which in each case can record, from a path position $x_i$ along the path 16, all light-emitting modules 4 simultaneously, i.e. at each path position $x_i$ records an image $B_i'$ (FIG. 12) of the entire display 1, said image containing the light pulses $I_i$ of all light-emitting modules 4 directed to this path position $x_i$.

Figure 12:
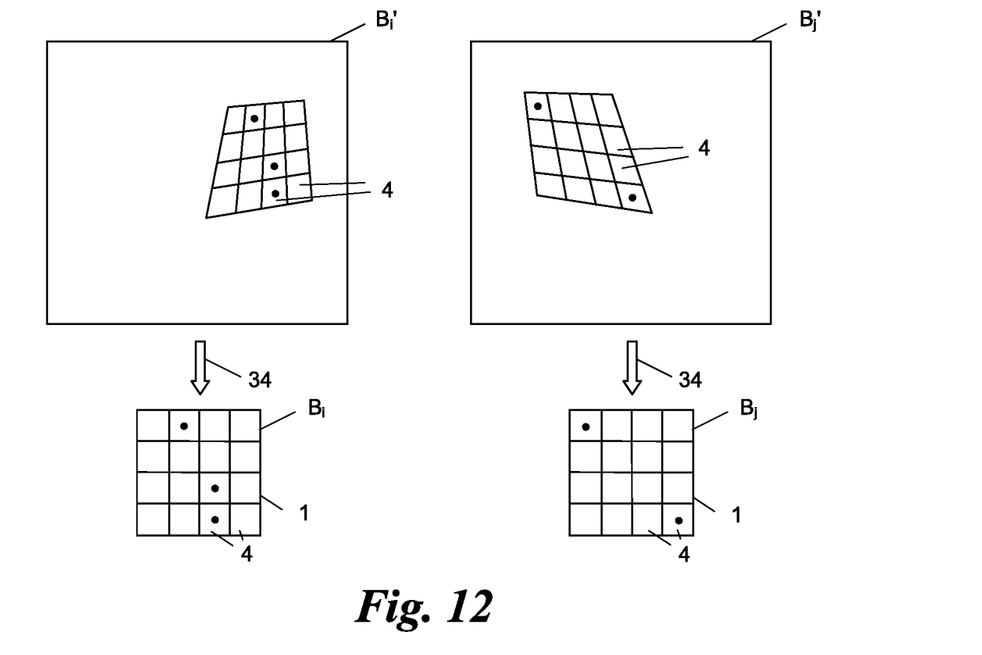
FIG. 12 shows the step of generating camera images of the method of FIG. 11.
Figure 13:
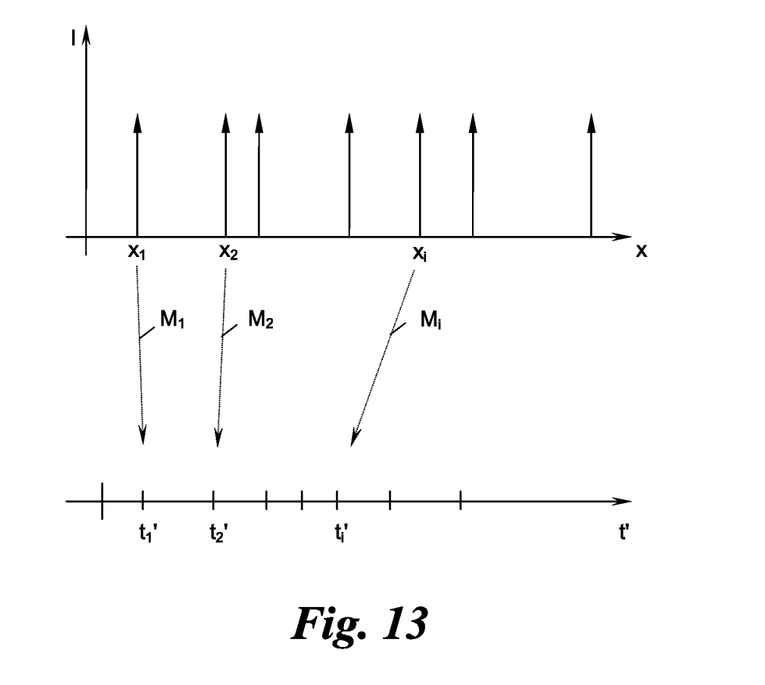
FIG. 13 shows the step of assigning recorded light pulse images over the path of movement of the camera of FIG. 11 to positions in an observer area corresponding to times.

FIG. 12 shows two images $B_i'$, $B_j'$ of the display 1 recorded at various points along the path 16, i.e. at two different path positions $x_i$, $x_j$ ($i \neq j$). Using geometric rectification 34, standardized and rectified images $B_i$, $B_j$ of the display 1 are extracted from the captured images $B_i'$, $B_j'$. If an image $B_i$ shows a light-emitting module 4 as lit up (represented by a dot symbol in FIG. 12), this indicates a light pulse $I_i$ of this light-emitting module 4 directed to the path position $x_i$, which light pulse $I_i$ thus can be assigned the path position $x_i$ as contact point $P_i$ over the path 16. If all images $B_i$ for a light-emitting module have been recorded along the path 16 and the presence of light pulses $I_i$ of this light-emitting module 4 has been checked in this way, the path positions $x_i$ of the light pulses $I_i$ thus determined can be plotted again along the path 16 and from this—with compensation for the horizontal position $\tilde{x}$ of the respective light-emitting module—the assignment table 26 can be obtained as described above.

Figure 11:
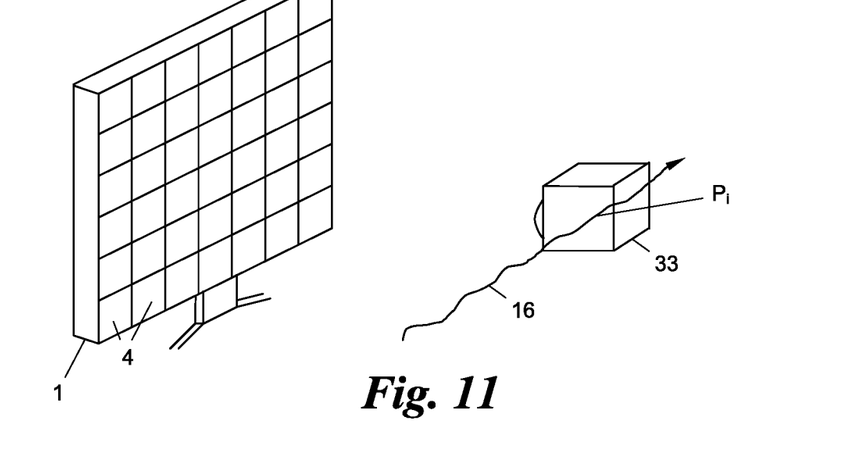
FIG. 11 shows a schematic perspective view of a second embodiment of the calibration method of the invention on the basis of the components involved.

If the path of movement 16 of the camera 33 was a straight line, the first times $t_i'$ for the assignment table 26 corresponding to the path positions $x_i$ can be assigned directly—as a simple linear relationship as explained above in FIG. 9. For this, the camera 33 can be guided along a rail at the desired calibration distance d at a constant speed. If, however, the path of movement 16 of the camera 33 is irregular (not straight), as shown in FIG. 11, and the camera is furthermore also guided with non-constant speed along the path 16, because it is, for example, held by hand, then an accurate determination of the respective location $x_i$ (FIG. 13) of the camera 33 when creating a recorded image $B_i'$ is then necessary in order to map or convert this at a corresponding first time $t_i'$ (FIG. 13), which would correspond to a camera motion along a straight path 16, see assignment arrows $M_i$ in FIG. 13.

With a known constant image generation rate of the camera 33, for example 25 images per second, the determination of the trajectory (space curve, spline) 16 of the camera 33 and its current momentary velocity is sufficient to determine the locations $x_i$ of the images $B_i$, assuming that the angular orientation of the camera over the path 16 may be disregarded, since this has already been taken into consideration by the rectification 34. The path or trajectory 16 of the camera 33 and the momentary speeds thereof along the path 16 can be determined here by the following variants, individually or in combination.

Figure 14:
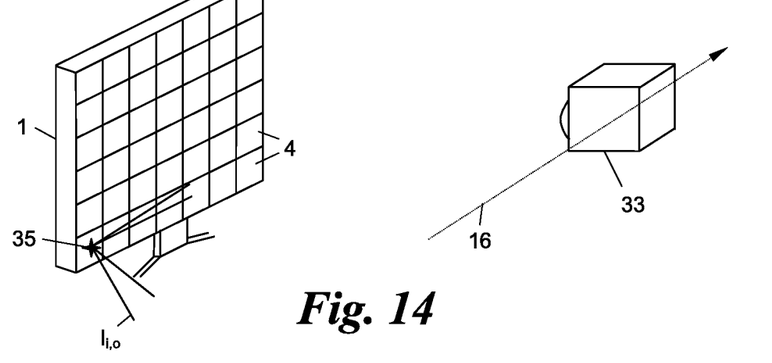
FIGS. 14 to 16 show three different variants of determining the path of movement of the light detector of FIG. 11 within the scope of the calibration method according to the invention.

In a first variant according to FIG. 14 a reference light-emitting module 35 is located for this purpose at a known location of the display 1, which light pulse $I_{i,o}$ projects into various known angles with respect to the display 1. If the camera 33 receives an illumination from the reference light-emitting module 35, the path position $x_i$ of the camera 33 can be determined from this.

The reference light-emitting module 35 can be configured as desired, for example one of the light-emitting modules 4 of the display 1 can be "pre-calibrated" using the calibration method shown in FIG. 9 and can serve as a reference light-emitting module 35; or it may be configured as a completely different device, for example comprises a plurality of light-emitting elements 8 having different, fixed emitting directions $\beta_o$ instead of an oscillating mirror 9.

FIG. 15 shows a further embodiment in which at least one reference camera 36 is connected to the camera 33 at a fixed distance $d_R$ via a common supporting structure 37 and is moved jointly with said camera 33 along the path 16. By comparing the images of the two cameras 33, 36 the movement of the cameras 33, 36 are determined, for example the speed and acceleration thereof, from which the trajectory 16 can be determined. For example, the camera 33 records an image $B_1$ and the reference camera 36 records the same image $B_1$ after 0.1 s. With a fixed distance of $d_R=10$ cm this results in a momentary speed of the camera 33 of 1 m/s. From a known start time and place, the direction of movement and the speeds thus determined, the individual images $B_i$ can be assigned path positions $x_i$.

Figure 16:
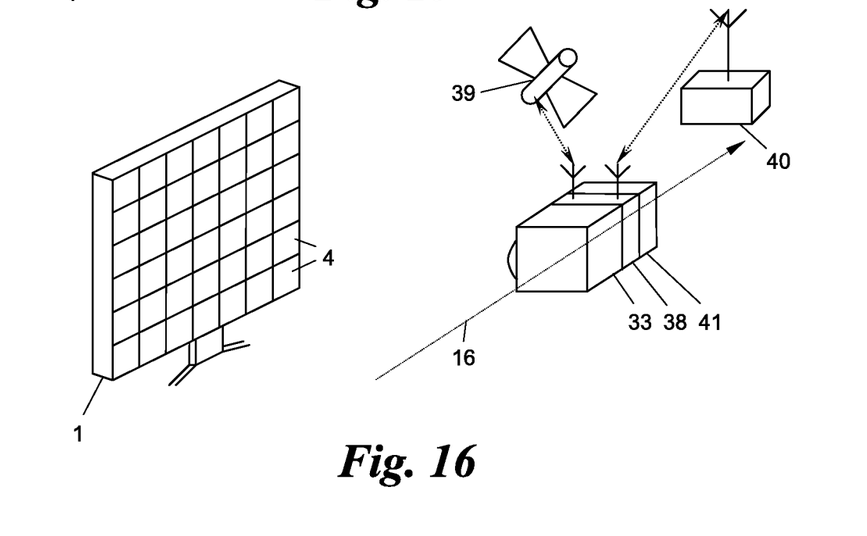

FIG. 16 shows yet another embodiment in which a satellite navigation receiver 38 for position measurement, for example a GPS or dGPS receiver, which receives position data from satellites 39 and/or terrestrial supporting beacons 40, and/or an inertial sensor (inertial measurement unit, IMU) 41 is/are attached to the camera 33 in order to determine the path of movement or trajectory 16 of the camera 33 for the stated purposes. The inertial sensor 41 may measure here an acceleration in translation along one, two or three spatial axes and/or a rotational acceleration about one, two or three spatial axes.

The embodiments of FIGS. 14 to 16 can be also used individually or together for an improved measurement accuracy. Also, other data such as tilt angle, distance from the camera 33 to the display 1, etc. can be used in order to increase the measurement accuracy.

The camera 33 and its optional components constituted by GPS receivers 38 and inertial sensor 41 can be realized for example by a commercially available smartphone that sends data to the computation units 18 of the display 1 via a radio interface in order to calibrate the display in the aforementioned manner.

The described light-emitting or projection apparatus can be used in any of the above-mentioned embodiments, not only as a display 1 for displaying three-dimensional images or videos, but also for directional displays, which show different contents depending on the position of the viewer ("multi-content"), or can be used for a directional projection of any light, for example as a headlight which can illuminate its target depending on its position.

Generally, a light-emitting module 4 can be calibrated, which light-emitting module comprises: a support 7, at least one mirror 9 mounted on the support, which mirror can be set periodically in oscillation about an oscillation axis 17 by a drive 13, which drive can be controlled by means of a control signal 14, and at least one light-emitting element 8, which is arranged on the support 7, is directed onto the mirror 9 and can be controlled via an input, characterized by a computation unit 18 having at least one input and one output, which is connected to the input of the light-emitting element 8, wherein the computation unit 18 is configured to output at least one sample value of the video signal 11, which sample value appears at the input of said computation unit at a first time $t_{i,1}$ within a period T of the mirror 9, at its output as a sample value at a second time $t_{i,2}$ within the same period T, which second time $t_{i,2}$ is different from the first time $t_{i,1}$, in accordance with a mapping function 23 that is stored in the computation unit 18.

Such a light-emitting module may be equipped as described with all of the above features.

A method for calibrating such a general light-emitting module 4 at a distance d comprises the steps of: a) setting the mirror 9 in oscillation about an oscillation axis 17 with a mirror period τ; b) feeding an electrical pulse $E_i$ at a known time $t_{i,1}$ into the input of the computation unit 18 within a mirror period τ; c) measuring the path position $x_i$ of a light pulse $I_i$ on a path 16, the light pulse $I_i$ being emitted by the light-emitting unit 9 in accordance with the electrical pulse $E_i$ and deflected by the mirror 9; d) storing the known time $t_{i,1}$, relative to the mirror period τ, as a second time $t_i''$ in an entry $EN_i$ of an assignment table 26 implementing the mapping function 23, and storing a time value corresponding to the measured path position $x_i$, relative to the mirror period T and the aforementioned distance d, as a first time $t_i'$ of this entry $EN_i$; and e) repeating steps b) to d), either individually or in their overall sequence, for at least one further electrical pulse $E_i$ at another known time $t_{i,1}$, which is different from the known times $t_{i-1,1}$, $t_{i-2,1}$, . . . , relative to the mirror period τ, of the previous pulses $E_{i-1}$, $E_{i-2}$, . . . , in order to produce at least one other entry $EN_i$ of the assignment table 26.

The method may be modified or extended by all the above features.

The invention is accordingly not limited to the illustrated embodiments, but encompasses variations and modifications which fall within the scope of the appended claims.

What is claimed is:

1. A display or projection apparatus comprising:
   a plurality of light-emitting modules, which are arranged in an array, wherein each light-emitting module comprises:
   a support,
   at least one mirror mounted on the support, which mirror can be set periodically in oscillation about an oscillation axis by a drive, which drive is controllable by a control signal,
   at least one light-emitting element, which is arranged on the support, is directed to the at least one mirror and is controllable via an input, and
   a first computation unit having at least one input and one output, which output is connected to the input of the at least one light-emitting element,
   wherein the computation unit is configured to output at least one sample value of the video signal, which sample value appears at the input of said computation unit at a first time within a period of the at least one mirror, at its output as a sample value at a second time within the same period, which second time is different from the first time, according to a mapping function that maps the first time to the second time and is stored in the computation unit,
   wherein the computation unit has a control input, via which the stored mapping function can be scaled, or offset, or scaled and offset, and
   wherein the display or projection apparatus further comprises a second computation unit common to the plurality of light-emitting modules and having an input and a multiplicity of outputs, each of which is connected to the control input of the computation unit of a light-emitting module,
   wherein the second computation unit is configured, for each light-emitting module depending on the respective position thereof in the array and on a target distance predetermined at the input thereof, to determine at least one of a scaling value and an offset value and to output this value at the corresponding output.

2. The display or projection apparatus according to claim 1, wherein the at least one light-emitting element comprises at least one light-emitting or laser diode.

3. The display or projection apparatus according to claim 1, wherein an optics is arranged on the support, which optics shapes a light pulse emitted by the at least one light-emitting element into a light fan in a plane parallel to the oscillation axis of the at least one mirror.

4. The display or projection apparatus according to claim 1, wherein the mapping function is implemented by an assignment table stored in the first computation unit and having a large number of entries, which each contain an assignment between a first and a second time.

5. The display or projection apparatus according to claim 1 for a video signal having at least two image channels, wherein the light-emitting modules are arranged downstream of a demultiplexer which is configured to supply, within a mirror period, each light-emitting module with portions from different image channels intended for this light-emitting module in a predetermined sequence.

6. A method for calibrating a light-emitting module, which includes a support,
- at least one mirror mounted on the support, which mirror can be set periodically in oscillation about an oscillation axis by a drive, which drive is controllable by a control signal,
- at least one light-emitting element, which is arranged on the support, is directed to the at least one mirror and is controllable via an input, and
- a computation unit having at least one input and one output, which output is connected to the input of the at least one light-emitting element,
- wherein the computation unit is configured to output at least one sample value of the video signal, which sample value appears at the input of said computation unit at a first time within a period of the at least one mirror, at its output as a sample value at a second time within the same period, which second time is different from the first time, according to a mapping function that maps the first time to the second time and is stored in the computation unit,
- wherein the computation unit has a control input, via which the stored mapping function can be scaled, or offset, or scaled and offset,
- wherein the method comprises the steps of:
  a) setting the at least one mirror in oscillation about an oscillation axis with a mirror period;
  b) feeding an electrical pulse at a known time within a mirror period into the input of the computation unit;
  c) measuring a path position of a light pulse on a path, the light pulse being emitted from the light-emitting unit according to the electrical pulse and deflected by the mirror;
  d) storing the known time, relative to the mirror period, as a second time in an entry of an assignment table implementing the mapping function, and storing a time value corresponding to the measured path position, relative to the mirror period and a distance, as a first time of this entry;
  e) repeating the steps b) to d), either individually or in their overall sequence, for at least one further electrical pulse at another known time, which is different from the known times, relative to the mirror period, of the previous pulses, in order to generate at least one further entry of the assignment table; and
  f) receiving at least one of a scaling value and an offset value at the control input of the computation unit for scaling or offsetting, respectively, the mapping function.

7. The method according to claim 6, wherein in step b) the pulse is fed repetitively over a plurality of mirror periods, each at said known time relative to the respective mirror period.

8. The method according to claim 6, wherein further entries in the assignment table are added by interpolating existing entries.

9. The method according to claim 6, wherein the known times of the fed pulses are spaced from one another in time according to the sampling period of the video signal and cover a mirror period.

10. The method according to claim 6, wherein the known times of the fed pulses within a mirror period are spaced from one another in time according to a multiple of the sampling period of the video signal, and wherein the method is repeated while varying the known times until these cover the mirror period corresponding to the sampling rate of the video signal.

11. The method according to claim 6, wherein the path position is measured in step c) by projecting the light pulse onto a screen and measuring on the screen with respect to an approximately horizontally extending path.

12. The method according to claim 6, wherein the path position is measured in step c) by moving a light detector along the path and measuring the detection location of the light pulse on the path.

13. A method for calibrating a display or projection apparatus according to claim 1, comprising:
  a) setting the mirror in oscillation about an oscillation axis with a mirror period;
  b) feeding an electrical pulse at a known time within a mirror period into the input of the computation unit;
  c) measuring the path position of a light pulse on a path, the light pulse being emitted from the light-emitting unit according to the electrical pulse and deflected by the mirror;
  d) storing the known time, relative to the mirror period, as a second time in an entry of an assignment table implementing the mapping function, and storing a time value corresponding to the measured path position, relative to the mirror period and a distance, as a first time of this entry;
  e) repeating the steps b) to d), either individually or in their overall sequence, for at least one further electrical pulse at another known time, which is different from the known times, relative to the mirror period, of the previous pulses, in order to generate at least one further entry of the assignment table; and
  f) receiving at least one of a scaling value and an offset value at the control input of the first computation unit for scaling, or offsetting, respectively, the mapping function;
  wherein the position is measured in step c) by moving a light detector along the path and measuring the detection location of the light pulse on the path;
  wherein the light detector is a camera, by means of which an image of all light-emitting modules is recorded at successive locations and times along the path, in which image the light pulses of the light-emitting modules are detected in order to calibrate each light-emitting module in the manner mentioned.

14. The method according to claim 12, wherein the path is referenced by means of at least one reference light-emitting module, which emits light pulses of known position, to said light pulses.

15. The method according to claim 12, wherein at least one of a speed and an acceleration of the camera along the path is determined by comparing the images thereof with the images of a further camera, which is mounted on the first-mentioned camera at a fixed distance.

16. The method according to claim 12, wherein the path is determined by means of at least one of an inertial sensor and a satellite navigation device of the light detector.

17. The method according to claim 13, wherein the path is referenced by means of at least one reference light-emitting module, which emits light pulses of known position, to said light pulses.

18. The method according to claim 13, wherein at least one of a speed and an acceleration of the camera along the path is determined by comparing images thereof with images of a further camera, which is mounted on the first-mentioned camera at a fixed distance.

19. The method according to claim 13, wherein the path is determined by means of at least one of an inertial sensor and a satellite navigation device of the light detector.

20. The display or projection apparatus according to claim 1, wherein the light-emitting element comprises three light-emitting or laser diodes having different primary colors.

* * * * *